(12) United States Patent
Baek et al.

(10) Patent No.: US 12,367,172 B2
(45) Date of Patent: Jul. 22, 2025

(54) SYSTEM-ON-CHIP, DATA PROCESSING SYSTEM HAVING THE SAME, AND OPERATING METHOD THEREOF PRELIMINARY

(71) Applicant: Samsung Electronics Co., Ltd., Suwon-si (KR)

(72) Inventors: Byungjoon Baek, Suwon-si (KR); Kyounghwan Moon, Suwon-si (KR); Jongsun Kim, Suwon-si (KR); Myungkyoon Yim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/297,258

(22) Filed: Apr. 7, 2023

(65) Prior Publication Data
US 2024/0061804 A1   Feb. 22, 2024

(30) Foreign Application Priority Data
Aug. 18, 2022  (KR) .......................... 10-2022-0103193

(51) Int. Cl.
*G06F 15/78*  (2006.01)
*G06F 11/10*  (2006.01)

(52) U.S. Cl.
CPC ...... *G06F 15/7814* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 9,188,644 B1 | 11/2015 | Blanton et al. | |
| 11,206,393 B2 | 12/2021 | Lee et al. | |
| 2017/0093439 A1* | 3/2017 | Motwani | G06F 11/1068 |
| 2020/0382400 A1 | 12/2020 | Saka | |
| 2021/0044867 A1 | 2/2021 | Butters | |
| 2021/0109807 A1* | 4/2021 | Papandreou | G06F 11/1048 |
| 2021/0209722 A1 | 7/2021 | Nandan et al. | |
| 2021/0410090 A1 | 12/2021 | Volkov et al. | |
| 2022/0022151 A1 | 1/2022 | Arai et al. | |

FOREIGN PATENT DOCUMENTS

| | | | | |
|---|---|---|---|---|
| CN | 104903832 A | | 9/2015 | |
| CN | 105119775 A | | 12/2015 | |
| CN | 114157595 A | * | 3/2022 | |
| CN | 114549129 A | * | 5/2022 | |
| WO | WO-0050974 A2 | * | 8/2000 | ............. A63F 13/12 |
| WO | WO-2006044476 A2 | * | 4/2006 | ............. G08G 1/054 |
| WO | WO-2022079989 A1 | * | 4/2022 | ............. G06V 10/56 |

* cited by examiner

*Primary Examiner* — Guerrier Merant
(74) *Attorney, Agent, or Firm* — Harness, Dickey & Pierce, P.L.C.

(57) ABSTRACT

An operating method of a system-on-chip (SoC) for autonomous driving includes receiving a request for measuring an internal delay time and measuring an internal delay time using a cyclic redundant check (CRC) table and an output timestamp, wherein the CRC table includes an input timestamp of first data, a first CRC value of the first data, and a second CRC value of the second data.

17 Claims, 12 Drawing Sheets

| Camera ID | Frame counter | CRC | Timestamp |
|---|---|---|---|

Input Table

| FRAME CNT | CRC | Timestamp |
|---|---|---|
| 1 | CRC1 | 20220610001 |
| 2 | CRC2 | 20220610002 |
| 3 | CRC3 | 20220610003 |
| 4 | CRC4 | 20220610004 |

Output Table

| FRAME CNT | CRC | Timestamp |
|---|---|---|
| 3 | CRC3 | 20220610013 |
| 4 | CRC4 | 20220610014 |
| 5 | CRC5 | 20220610015 |
| 6 | CRC6 | 20220610016 |

Internal Delay Time = Timestamp Difference for same CRC value (Latency)

SYSTEM-ON-CHIP, DATA PROCESSING SYSTEM HAVING THE SAME, AND OPERATING METHOD THEREOF PRELIMINARY

CROSS-REFERENCE TO RELATED APPLICATION(S)

This application claims benefit of priority to Korean Patent Application No. 10-2022-0103193 filed on Aug. 18, 2022 in the Korean Intellectual Property Office, the disclosure of which is incorporated herein by reference in its entirety.

BACKGROUND

The present inventive concepts relate to a system-on-chip, a data processing system having the same, and an operating method thereof.

In general, semiconductor chips for vehicles are used in sensors that measure various information, such as temperature, pressure, and speed inside/outside vehicles, engines, transmissions, and electronic control units (ECUs), and driving devices, such as motors moving various devices. Semiconductor chips for vehicles are equipped with functions of monitoring a delay inside chips as a security requirement and notifying users when an abnormal delay occurs.

SUMMARY

The present inventive concepts are to provide a system-on-chip measuring internal delay time in a heterogeneous software (SW) stack structure, a data processing system having the same, and an operating method thereof.

According to the present inventive concepts, an operating method of a data processing system includes: recording, when first image data is input to a first software (SW) domain, an input timestamp of the first image data to first metadata; calculating a first unique value of the first image data in the first SW domain; storing the first metadata having the input timestamp and the first unique value in a lookup table (LUT); calculating, when second image data is transmitted from the first SW domain to a second SW domain, a second unique value of the second image data in the second SW domain; recording, when the second image data is output from the second SW domain, an output timestamp of the second image data in second metadata; storing the second metadata having the output timestamp and the second unique value in the LUT; selecting metadata in which the first unique value and the second unique value match each other in the LUT; and measuring a delay time of a system using a difference between an input timestamp and an output timestamp corresponding to the selected metadata.

According to the present inventive concepts, an operating method of a system-on-chip (SoC) for autonomous driving includes: receiving a request for measuring an internal delay time; and measuring an internal delay time using a cyclic redundant check (CRC) table and an output timestamp, wherein the CRC table includes an input timestamp of first data, a first CRC value of the first data, and a second CRC value of the second data.

According to the present inventive concepts, a data processing system includes: a plurality of cameras; a display processing unit processing image data; and a data processor configured to receive the image data from each of the plurality of cameras and outputting the image data to the display processing unit, wherein the data processor is configured to measure an internal delay time using a cyclic redundant check (CRC) table and an output timestamp, and the CRC table includes an input timestamp of first data, a first CRC value of the first data, and a second CRC value of the second data.

According to the present inventive concepts, a system-on-chip (SoC) includes: a central processing unit (CPU) controlling an overall operation; a graphics processing unit (GPU) performing graphics processing; a memory device storing temporary data during an operation of the CPU and the GPU and storing a cyclic redundant check (CRC) table; and a power management unit supplying power to the CPU, the GPU, and the memory device, wherein at least one of the CPU and the GPU is implemented as a structure of a plurality of software (SW) stacks, and the CRC table includes, when first data is input from a first external device, an input timestamp, a first CRC value of the first data, and a second CRC value of second data.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, example embodiments of the present inventive concepts will be described with reference to the accompanying drawings.

A system-on-chip (SoC), a data processing system having the same, and an operating method thereof according to example embodiments of the present inventive concepts may be implemented as a plurality of software (SW) stacks and may measure internal processing delay time. According to example embodiments of the present inventive concepts, each of the plurality of SW stacks may include a device driver, a kernel, a user library, and/or an application. Also, a plurality of SW stacks may be used to process different hardware. In addition, each of the plurality of SW stacks may be implemented as different data structures. The SoC and an operating method thereof according to example embodiments of the present inventive concepts are capable of extracting an inter-internal delay time passing through a plurality of hardware without being internally affected among a plurality of SW stacks implemented with different data structures.

Figure 1:
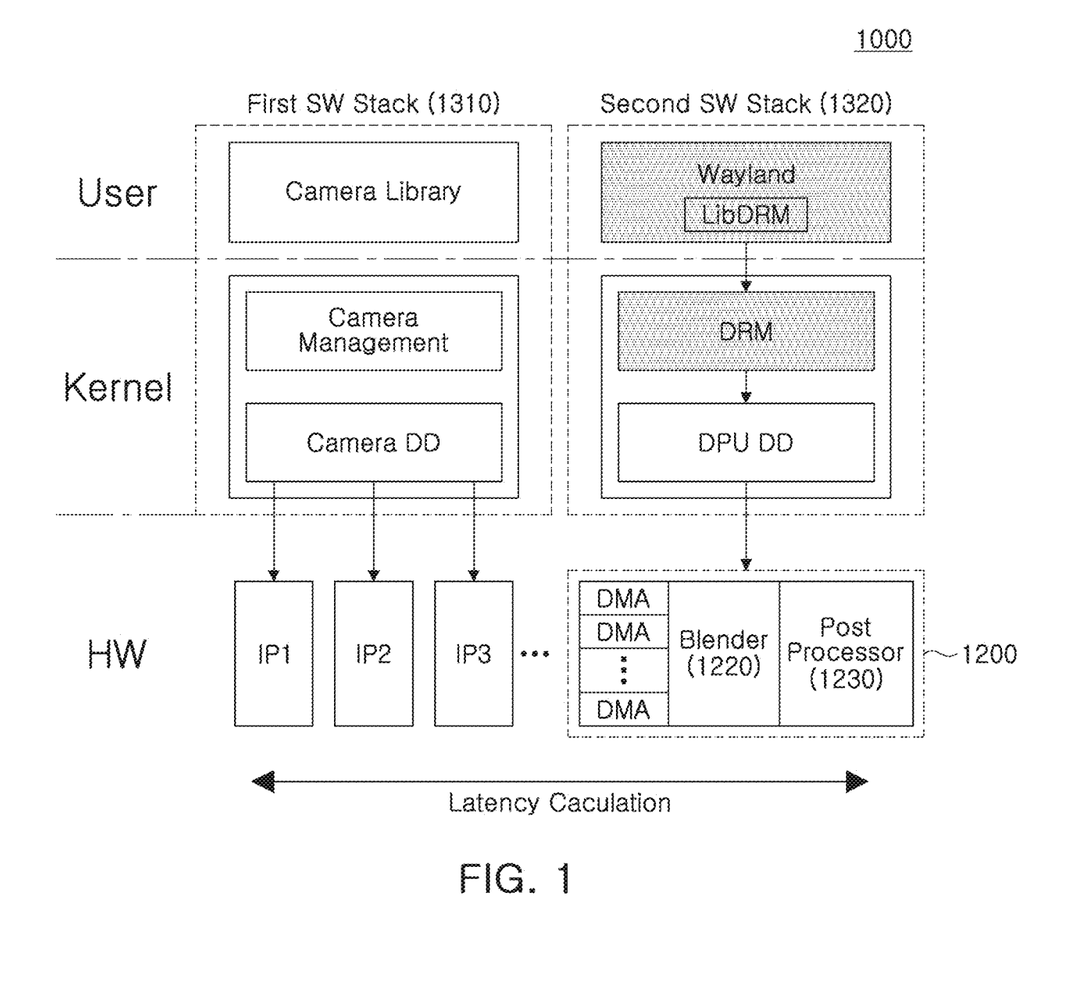
FIG. 1 is a diagram illustrating a general data processing system by way of example.

FIG. 1 is a diagram illustrating a general data processing platform 1000 by way of example. Referring to FIG. 1, the data processing platform 1000 includes a plurality of devices IP1, IP2, IP3, . . . , a display processing unit (DPU) 1200, and/or SW stacks 1310 and 1320. According to example embodiments of the present inventive concepts, the SW stacks 1310 and 1320 may be driven by a data processor. The data processor may be implemented as an SoC performing data processing.

Multiple SW stacks may use different standardized SW configuration layers. In FIG. 1, for convenience of description, it is assumed that the multi-SW stack has a first SW stack 1310 and a second SW stack 1320. According to example embodiments of the present inventive concepts, the first SW stack 1310 may be a camera SW stack, and the second SW stack 1320 may be a display SW stack. In example embodiments, the first SW stack 1310 may self-modify a camera device driver, a camera management unit, and/or a camera library. In example embodiments, the second SW stack 1320 may be an open-source based hybrid SW stack. The second SW stack 1320 includes a DPU device driver (DPU DD), a direct rendering manager (DRM), and wayland having a DRM library (LibDRM).

Input data is received by an input terminal of the data processor, and a processing time (or latency) needs to be measured until output data is output to an output terminal of the data processor. In order to measure the delay time, metadata is generated to have additional information, such as time information, along with original data (e.g., image data, audio data, etc.). Generally, when transmitting and receiving data, such metadata is transferred along with the original data. The delay time of the data processor is calculated by including the input time measured at the input terminal in the metadata structure and differentiating the time measured at the output terminal and the input time of the metadata. For example, the delay time satisfies the following equation.

$$\text{Latency} = T_{end} - T_{start} \quad \text{[Equation 1]}$$

According to example embodiments of the present inventive concepts, $T_{start}$ is the input time of the frame captured as input to the data processor, and $T_{end}$ is the output time of the frame output from the data processor.

In general, the data processing platform 1000 implemented as a multi-SW stack calculates latency using metadata.

Figure 2:
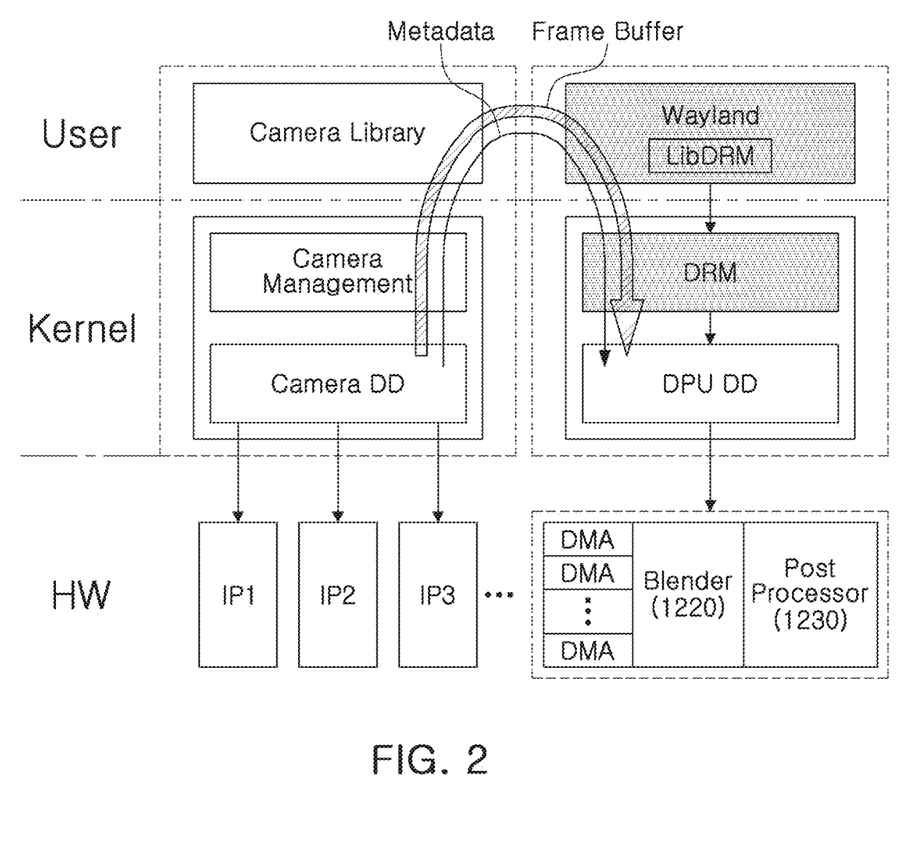
FIG. 2 is a diagram illustrating latency measurement using indirect communication through a framework in a system-on-chip (SoC) implemented in a multi-software (SW) stack structure.

FIG. 2 is a diagram illustrating latency measurement using indirect communication through a framework in an SoC implemented in a multi-SW stack structure. In general, metadata may be directly transmitted between device drivers, but frame buffer management is controlled by a SW framework. That is, it is impossible to perform complete direct device driver communication without the SW framework. As illustrated in FIG. 2, in order to measure latency using indirect communication through a framework, a mechanism may be advantageous to connect a plurality of metadata to an appropriate buffer frame.

Manual code and a data structure may be inserted or fixed in the SW framework for metadata transmission. After code fixation, compatible stability may be obtained. For example, such compatible stability may be required between a camera SW stack, a neural processing unit (NPU) SW stack, or a display processing unit (DPU) SW stack. Also, when updating the framework as needed, maintainability may be obtained. As illustrated in FIG. 2, a change in an open-source may be required when transmitting metadata from a lower layer to an upper layer or from an upper layer of another SW stack to a lower layer. In some example embodiments, it may be advantageous to re-examine the compatibility and stability maintained by the existing SW. Also, when the open-source is changed, maintainability should be guaranteed to correspond to a new source.

Figure 3:
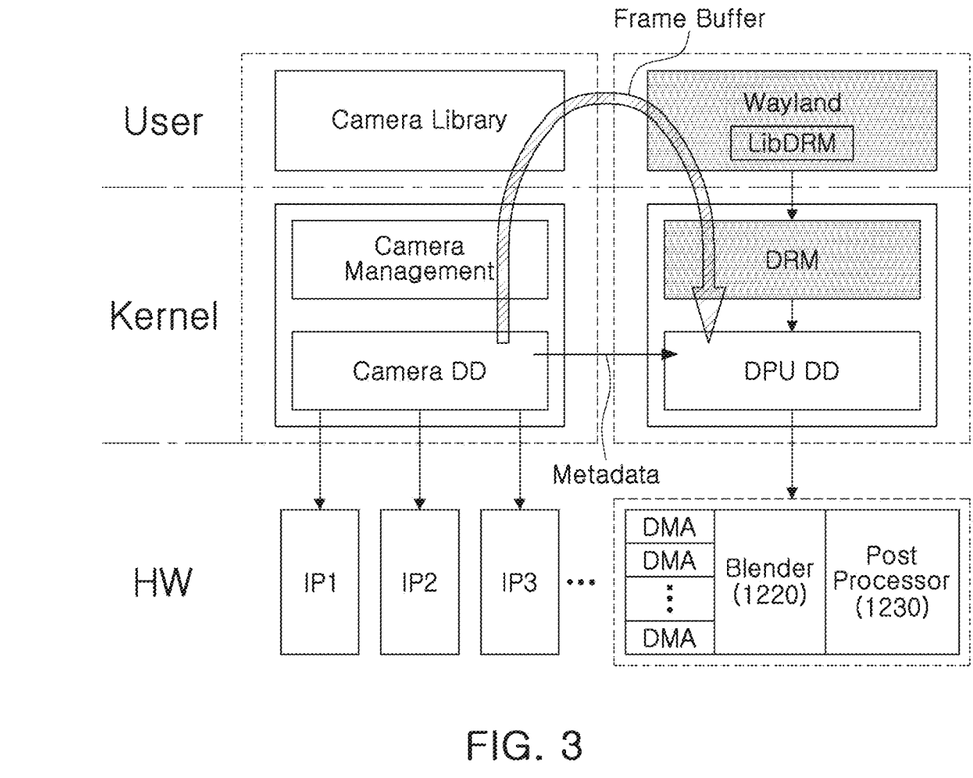
FIG. 3 is a diagram illustrating latency measurement using direct device driver communication in an SoC implemented with a multi-SW stack structure.

FIG. 3 is a diagram illustrating latency measurement using direct device driver communication in an SoC implemented with a multi-SW stack structure.

As illustrated in FIG. 3, by separately receiving frame data and metadata in direct device driver communication, maintainability may be guaranteed without changing the open-source. In addition, a structure for reconnecting separately received frame data and metadata may be advantageous. When receiving frame data simultaneously in a multi-camera situation, a mechanism may be advantageous to know which frame buffer is connected to which metadata.

Figure 4:
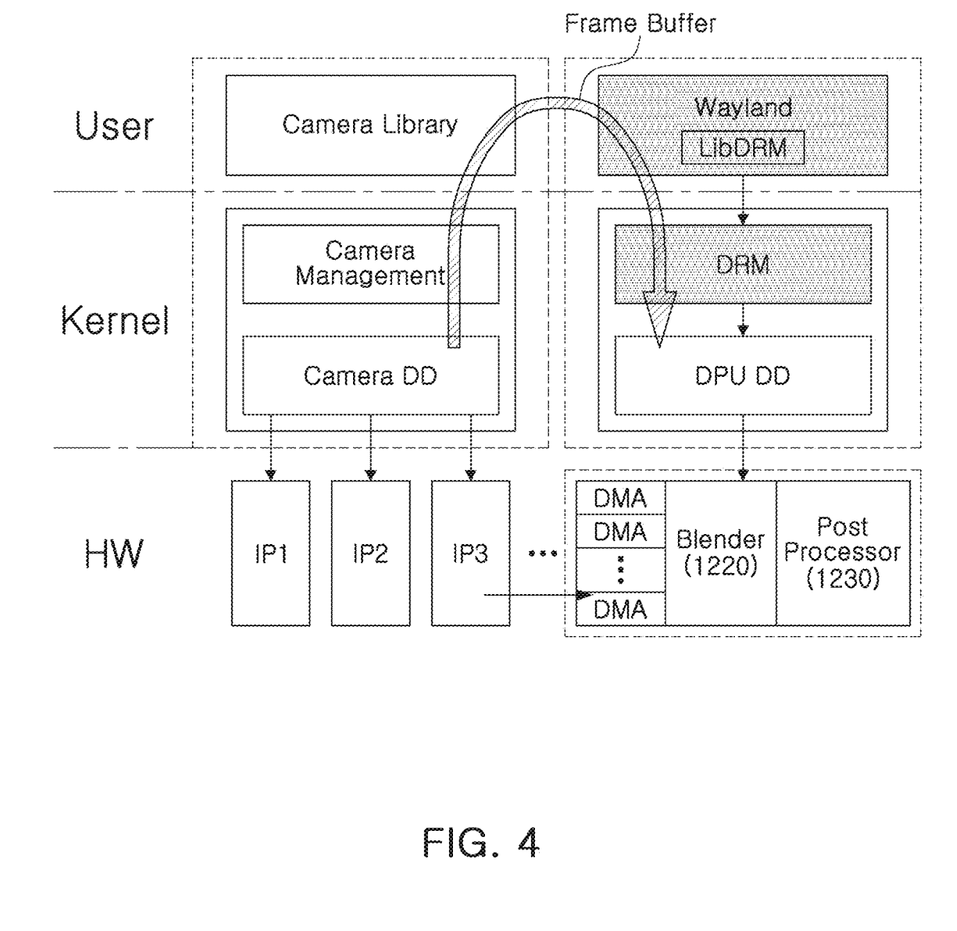
FIG. 4 is a diagram illustrating latency measurement using hardware (HW) metadata transmission in an SoC implemented to have a multi-SW stack structure.

FIG. 4 is a diagram illustrating latency measurement using hardware (HW) metadata transmission in an SoC implemented with a multi-SW stack structure. As illustrated in FIG. 4, when metadata is transmitted in a HW, a HW attaching a line for transferring additional information in the form of an embedded line at the beginning or end of a frame buffer may be used. For example, for the HW, a frame buffer as large as the embedded line may be allocated, and when necessary, only an image area is processed or memory allocation may be released. A structure for allocating a frame buffer should use an open-source. It may be difficult in changing or avoiding open-source.

For latency measurement using HW metadata transfer, the framework may allocate/release appropriate memory space for frames having an embedded line (e.g., 1080+2). In particular, the DPU may know a composite image from the metadata embedded frame (e.g., frame sensor) and the GPU.

The SoC, the data processing system having the same, and the operating method thereof according to example embodiments of the present inventive concepts may calculate an internal system processing time using an indirect metadata information transfer method under various system conditions. In particular, in example embodiments of using an open-source-based SW, the SoC and the data processing system having the same according to example embodiments of the present inventive concepts may calculate latency using metadata tables corresponding to different heterogeneous SW domains even if desired metadata transfer is not supported. According to example embodiments of the present inventive concepts, each of the metadata tables includes an unique value of frame data and time information (e.g., timestamp). In example embodiments, the unique value of frame data may be a cyclic redundancy check (CRC) code value.

The SoC, a data processing system having the same, and an operating method thereof according to example embodiments of the present inventive concepts may use an indirect metadata information transfer method in order to eliminate a difficulty in directly transmitting additional information for image data or the need for frequent maintenance and post-processing due to SW updating or the like. This indirect metadata information transfer method may be applied to a system that operates even in a situation that does not directly support connection between the image data and metadata, which is additional information on the image data. To this end, a mechanism for confirming correlation between image data transmitted between different SW domains and independently managed metadata may be advantageous. That is, image data and derived metadata may be separately managed without being bundled and managed in the form of a data structure. Image data is transferred between different SW domains in a general manner, and when image data is transferred, a process of selecting and using metadata by searching metadata related to corresponding image data from separately managed metadata. Time information (e.g., timestamp) of an input time point is brought from searched/selected metadata, and such input time information may be transmitted together with corresponding image data.

It is possible to link data structures in the same SW domain and transmit the same. In this manner, the process of transmitting information within a system including the same domain and different domains may be repeated until a point at which image data is output. Thereafter, output time information may be obtained again at an output time point. Thereafter, a difference between the obtained output time information and the input time information transmitted through metadata may be calculated. This differential value is a delay time inside the system. In the manner described above, a time delay inside the system may be measured.

Figure 5:
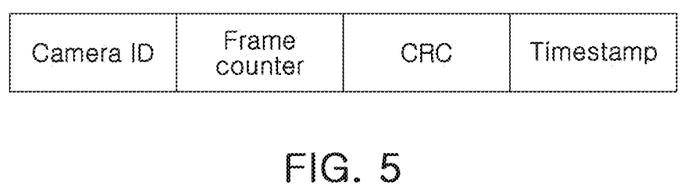
FIG. 5 is a diagram illustrating metadata according to example embodiments of the present inventive concepts by way of example.

FIG. 5 is a diagram illustrating metadata of an SoC according to example embodiments of the present inventive concepts. Referring to FIG. 5, metadata may include a camera identification number, a frame counter, a CRC value, and/or a timestamp. According to example embodiments of the present inventive concepts, the camera identification number is a number for identifying an input camera among a plurality of cameras. Also, the frame counter is a value for distinguishing between different frames.

The SoC, the data processing system having the same, and the operating method thereof according to example embodiments of the present inventive concepts may use an unique value of image data in the process of searching separately delivered image data and metadata derived from the image data. According to example embodiments of the present inventive concepts, the unique value may be a CRC value.

In general, even in example embodiments of a perfectly still image, image data changes at least partially at the level of a pixel value in each frame due to the effect of noise in terms of the characteristics of an image. Also, the angle of view may be slightly shaken. Therefore, when image data is compared with a previous frame, example embodiments in which each frame matches each other rarely occur probabilistically. Considering such characteristics of images, a CRC value of each frame may be used as a frame unique value for each frame of different images. Metadata having a CRC value matching a CRC value of a desired image frame may be selected from among various pieces of metadata stored using such a CRC value. Through this process, metadata connected to the current frame may be searched.

In example embodiments, when managing metadata, a CRC value corresponding to an unique value of image data may be stored. In addition, by storing additional information (according to example embodiments of the present inventive concepts, a timestamp) together with the CRC value, metadata for a frame may be managed.

Figure 6:
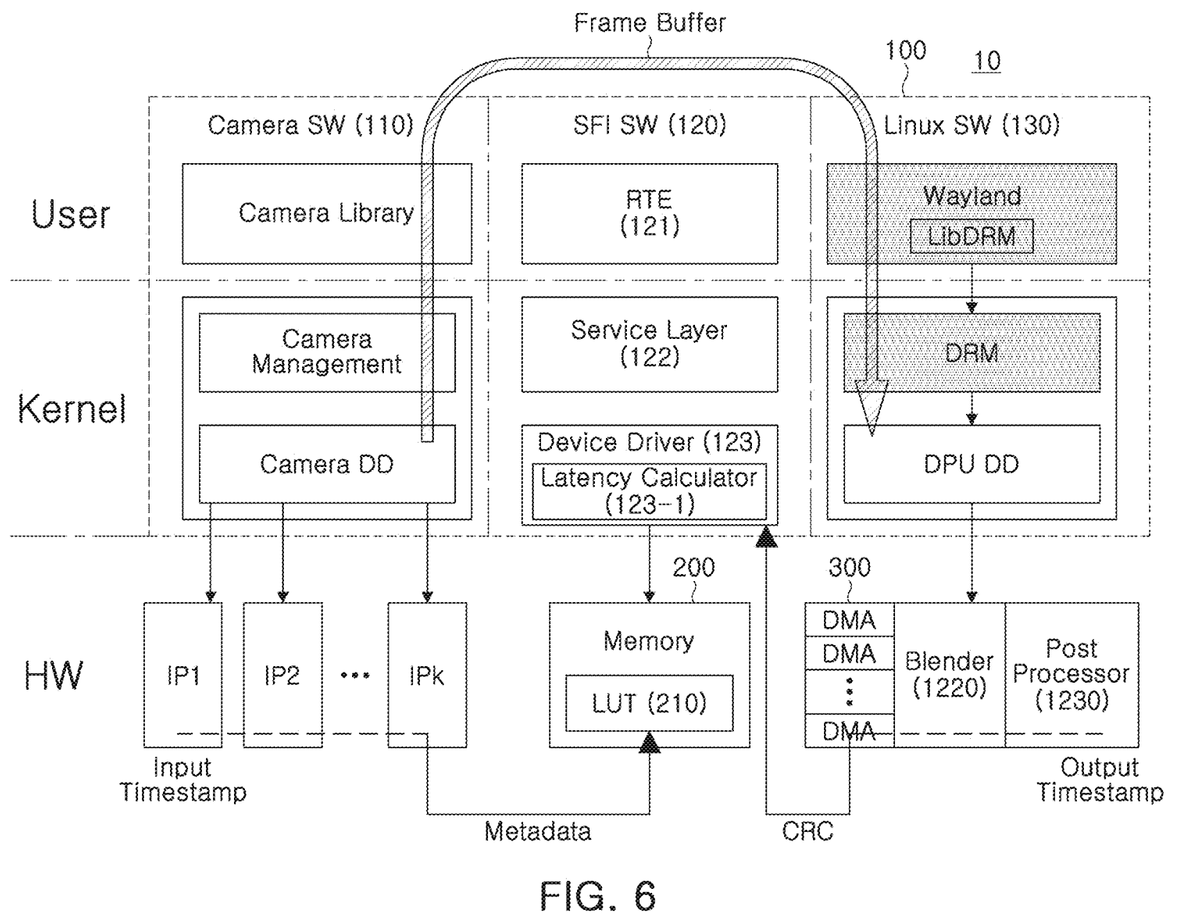
FIG. 6 is a diagram illustrating a data processing system implemented to have a multi-SW stack according to example embodiments of the present inventive concepts.

FIG. 6 is a diagram illustrating a data processing system 10 implemented with a multi-SW stack 100 according to example embodiments of the present inventive concepts by way of example. Referring to FIG. 6, the data processing system 10 may include a plurality of IPs IP1 to IPk (k is an integer greater than or equal to 2) controlled by the multi-SW stack 100, a memory device 200, and/or a DPU 300. According to example embodiments of the present inventive concepts, the multi-SW stack 100 may include a camera SW stack 110, a CPU SW stack 120, and/or a display SW stack (or Linux SW stack) 130.

As illustrated in FIG. 6, image data is transmitted from a domain of the camera SW stack 110 to a domain of the display SW stack 130. Metadata related to such image data may be generated in a first IP of HW. After being transferred in the same domain, metadata having an input type stamp may be stored in a lookup table (LUT) of the memory device 200. When image data is transmitted between different domains, the CPU SW 120 may intervene. In example embodiments, the CPU SW 120 may include a safety island (SFI) SW. According to example embodiments of the present inventive concepts, SFI SW is a program intervened by a security-related dedicated CPU. Even without the SFI SW, a latency calculation operation may be performed through another CPU SW loaded in an appropriate CPU. In example embodiments, writing metadata to the memory device 200 may be performed by generating an interrupt. In other example embodiments, when metadata is generated through DMA without SW intervention through an interrupt, the metadata may be directly written into a memory.

The CPU SW 120 may include a user-level run-time environment (RTE) 121, a kernel-level service layer 122, and/or a device driver 123. In general, the RTE 121 is a virtual functional bus (VFB). The RTE 121 supports client/server and sender/receiver communication models. The client/server model refers to a communication method in which client SW requests a predefined (or alternatively, desired) service to a server SW and receives a corresponding result. In the sender/receiver model, a sender SW distributes data and a receiver SW receives the distributed data.

The device driver 123 may include a latency calculator 123-1. The latency calculator 123-1 may calculate a CRC value, which is an unique value of image data extracted from an image data receiving unit (DMA of the display domain HW layer in FIG. 6), search the LUT 210 for metadata having a CRC value matching the CRC value calculated in the CPU SW, and finally calculate a delay time of the image data transmitted between different domains using time information included in the metadata searched from the LUT 210.

Thereafter, the latency calculator 123-1 may transmit image data and derived information (e.g., timestamp) together within the same domain, retrieve the timestamp again at the time of final output, calculate a difference value between the timestamp at the output time and the timestamp at the input time, and extract a system internal delay value using the difference value. In example embodiments, the estimated system interval value may be a difference value of the timestamps. In other example embodiments, the estimated system internal value may be another value estimated from the difference value of the timestamps.

The memory device 200 may be implemented as a volatile memory device. The volatile memory device 200 may be implemented as random access memory (RAM), dynamic RAM (DRAM), static RAM (SRAM), or low power double data rate (LPDDR) DRAM. Also, the memory device 200 may be implemented as a non-volatile memory device. For example, the memory device 200 may be implemented as an electrically erasable programmable read-only memory (EE-PROM), flash memory, MRAM, STT-MRAM, ferroelectric RAM (FeRAM), phase change RAM (PRAM), resistive RAM (RRAM), nanotube RRAM, polymer RAM (PoRAM)), nano floating gate memory (NFGM), holographic memory, molecular electronics memory devices, or an insulator resistance change memory.

Also, the memory device 200 may include an LUT 210. The LUT 210 may be managed in the form of a ring buffer having an appropriate size in consideration of characteristics of a length of time during which real-time image data is transmitted. In a general manner, information has a control flow in which the information is transferred from a lower level of abstraction (e.g., HW) to a higher level of abstraction, then to a higher level in another domain, and goes down from the higher level in the other domain down to a lower level.

In addition, in order to provide additional information in addition to the data flow provided by the data processing system 10, a control and information transfer structure for transferring information in a method not provided by a data processing platform or framework may be changed. In example embodiments, when additional information is transferred to a user up to a higher level of abstraction, the user may access the information. In addition, in example embodiments of using SWs that do not support such user access, information is not directly exposed to the user even when information is transferred at a lower abstraction level. It may be designed independently regardless of changes in the higher SW.

The data processing system 10 according to example embodiments of the present inventive concepts may measure an internal delay time of the system in the following order. A timestamp value at the time of input may be recorded in the LUT. According to example embodiments of the present inventive concepts, the timestamp representing time information may be obtained from a real time clock (RTC) or other clock source. The timestamp is an actual time value or a value from which a time value may be estimated. The timestamp value may be transferred along with image data to the end of the corresponding domain. Within the same SW stack, information may be transferred from the beginning to the end of a region controlled by the corresponding SW in various manners. During this process, a CRC value of an image is calculated for later use, and the calculated CRC value may be delivered together with a timestamp value corresponding to the image data.

When image data is changed during delivery and the CRC value is changed, the existing CRC value may be replaced with the changed CRC value and stored in the LUT 210. In the last block of the corresponding SW domain, CRC/timestamp values may be bundled and stored in the LUT 210. In a domain receiving image data, a unique CRC value of image data may be calculated from the image data. Metadata having the same CRC value may be searched from the created LUT 210 using the CRC value calculated in this manner. Matched metadata may be selected as a search result. The selected metadata may be delivered to the end of the HW within the domain.

In a method using a general method within the same domain, the LUT 210 search method described above may be repeated between domains until the last output point. A timestamp value at the time of image output may be recorded in the last domain in which an output value is generated. A difference between a timestamp value at an output time point and a timestamp value at an input time point is calculated, and a delay time inside the system may be measured from the difference value.

As described above, the latency calculation operation of the system may be processed by the CPU SW 120. However, the present inventive concepts are not limited thereto. The latency calculation operation of the present inventive concepts may be partially or entirely implemented in HW. In example embodiments, calculating the difference at the output point and estimating a delay time may be implemented in HW.

In addition, a portion generating an LUT and a portion calculating an overall latency including the portion may be implemented in HW. In general, a latency calculator may be configured as a ring-buffer in terms of the characteristics of processing streaming. In example embodiments, when the latency calculator is implemented as a ring-buffer, the size may be fixed. Accordingly, the latency calculator may push metadata by using a separate memory (e.g., a subordinate SRAM rather than a common DRAM) as a structure in which an input/output is automatically updated. This way, the latency calculator may eliminate SW intervention to generate the LUT. In addition, since the portion bringing the timestamp described above is implemented from HW, it is possible to design to eliminate a transfer process to SW.

The latency calculation operation of the present inventive concepts may be implemented only with hardware including or connected to the memory 200 as described above without the CPU SW 120 illustrated in FIG. 6. In the delay time calculation operation described above, the CRC value of the frame is used as an unique value. However, the present inventive concepts are not limited thereto. In the present inventive concepts, other encoding values may be used as unique values of image data.

It should be understood that the data processing system 10 according to example embodiments of the present inventive concepts is not limited to measurement of the delay time of image data. The data processing system according to example embodiments of the present inventive concepts may be used for transmission of a signal continuously changing over time due to noise, such as voice, in addition to an image.

In addition, the SoC, the data processing system including the same, and the operating method thereof according to example embodiments of the present inventive concepts may use an approach of using a CRC value as an unique value when generating the same image data with an internal pattern generator of the system. Therefore, when an abnormal measurement value or error occurs, it is applicable to all systems implemented with an internal transfer structure by an unique value, such as a CRC value.

Figure 7A:
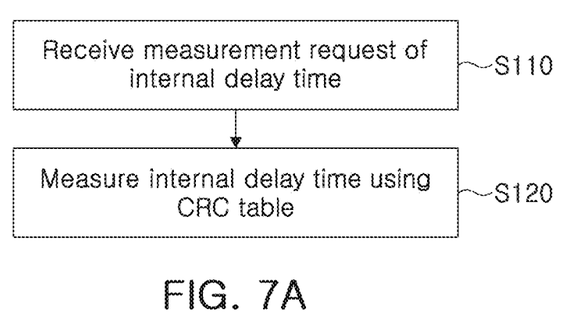
FIG. 7A is a flowchart illustrating an operating method of an SoC according to example embodiments of the present inventive concepts.

FIG. 7A is a flowchart illustrating an operating method of an SoC according to example embodiments of the present inventive concepts. Referring to FIG. 7A, the operation of the SoC may be performed as follows.

The SoC may receive a measurement request of an internal delay time (S110). The SoC may measure the internal delay time using a CRC table and an output timestamp (S120).

In example embodiments, the SoC may generate metadata having a camera identification number, a frame counter, a CRC value, and/or a timestamp. In example embodiments, the SoC may measure an internal delay time by driving a device driver of a secure SW stack. In example embodiments, metadata having the same CRC value may be retrieved from a CRC table by the device driver. In example embodiments, a difference value between an input timestamp and an output timestamp stored in the CRC table is calculated, and the difference value or a value corresponding to the difference value may be determined as an internal delay time.

Figure 7B:
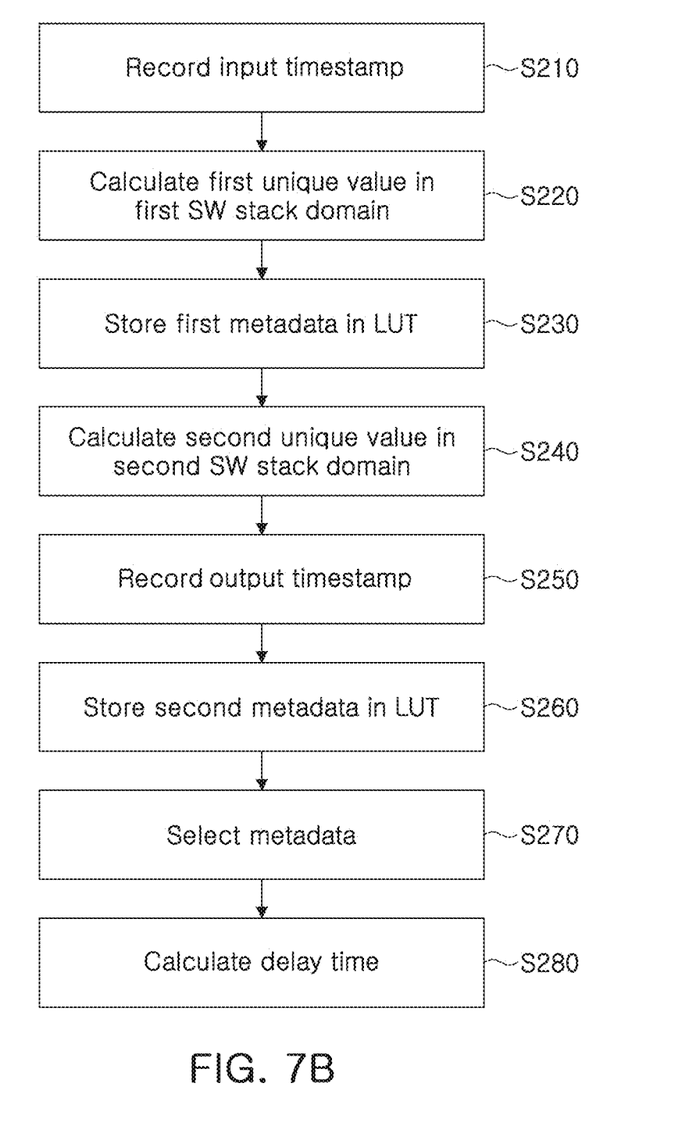
FIG. 7B is a diagram illustrating an operating method of a data processing system according to example embodiments of the present inventive concepts by way of example.

FIG. 7B is a diagram illustrating an operating method of a data processing system according to example embodiments of the present inventive concepts by way of example. Referring to FIG. 7B, the operation of the data processing system may be performed as follows.

When first image data is input to the first SW domain, an input timestamp of the first image data may be recorded in the first metadata (S210). A first unique value of the first image data may be calculated in the first SW domain (S220). The first metadata having the input timestamp and the first unique value may be stored in a LUT (S230). When second image data is transmitted from A first SW domain to A second SW domain, a second unique value of the second image data may be calculated in the second SW domain (S240). When the second image data is output from the second SW domain, an output timestamp of the second image data may be recorded in the second metadata (S250). The second metadata having the output timestamp and the second unique value may be stored in the LUT (S260). According to a measurement request of internal delay time in the system, metadata in which the first unique value and the second unique value match may be selected from the LUT (S270). A delay time of the system may be measured using a difference between the input timestamp and the output timestamp corresponding to the selected metadata (S280).

In example embodiments, each of the input timestamp and the output timestamp may include time information output from the RTC or an external clock source. In example embodiments, each of the first unique value and the second unique value may be a cyclic redundant check (CRC) value. In example embodiments, when the CRC value is changed during transmission of the image data, the changed CRC value may be stored in the LUT. In example embodiments, a measurement request for delay time may be received from an external device. In example embodiments, an operation of selecting metadata in the secure SW domain and an operation of measuring a delay time may be performed.

In example embodiments, the LUT may include an input table storing first metadata and an output table storing second metadata. In example embodiments, an list having the same CRC value may be retrieved from the input table and the output table. In example embodiments, the first SW domain and the second SW domain may transmit data in different data structures. In example embodiments, the first SW domain may be a camera SW domain, and the second SW domain may be a Linux SW domain.

Figure 8A:
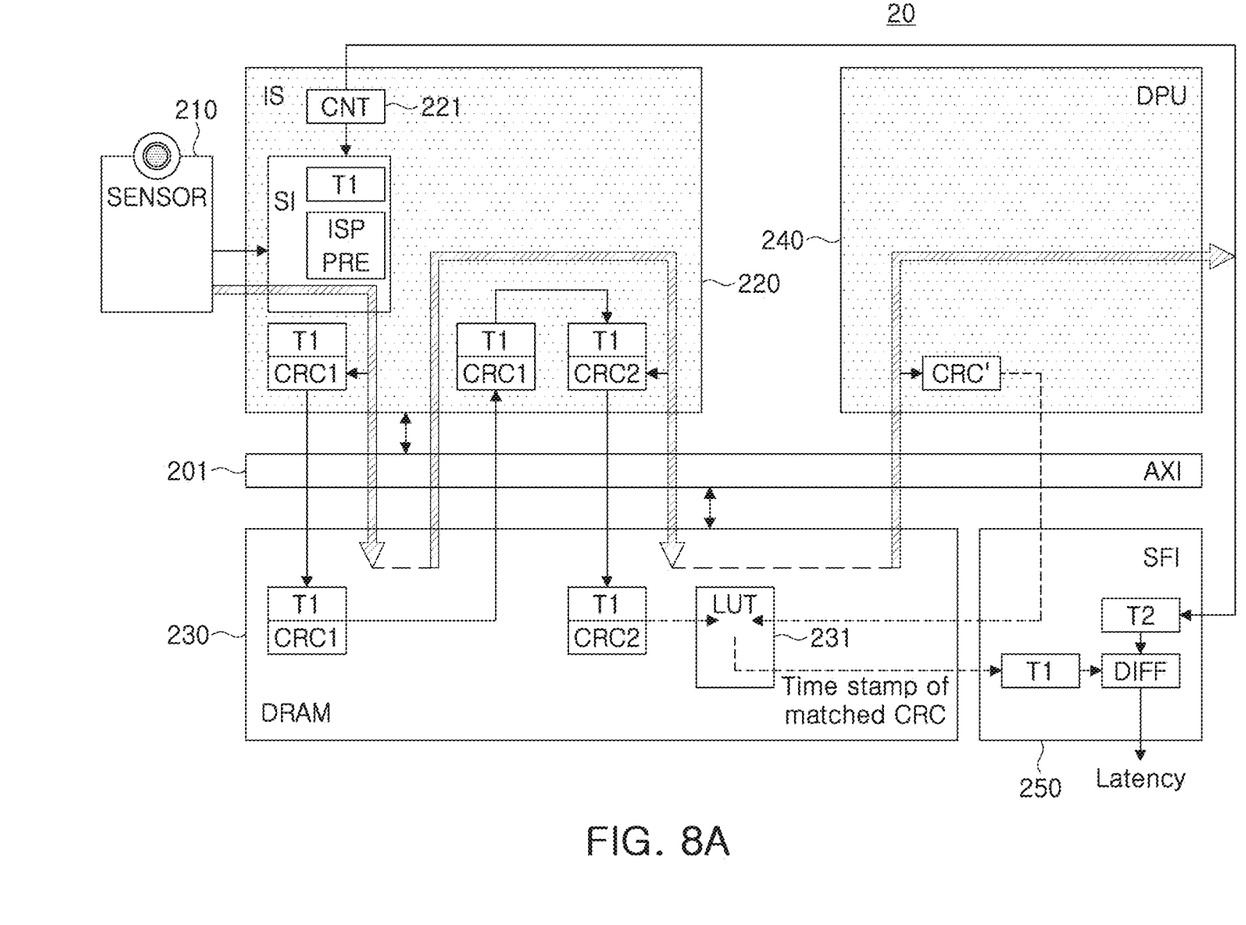
FIG. 8A is a diagram illustrating a data processing system according to example embodiments of the present inventive concepts.

FIG. 8A is a diagram illustrating a data processing system 20 according to example embodiments of the present inventive concepts. Referring to FIG. 8A, the data processing system 20 may include a sensor 210, an IS 220 connected to a system bus 201, a DRAM 230, a DPU 240, and an SFI 250.

The image sensor 210 may generate image data according to a detection operation and output the image data to the ISP 220.

The IS 220 (SW stack) may be implemented to process image data. The IS 220 may include a counter 221. A buffer ISP PRE of the IS 220 may receive image data and store a timestamp T1 corresponding to the image data. The IS 220 may generate a CRC value CRC1 corresponding to the image data. When transmitting the image data to the DRAM 230, the IS 220 may simultaneously output the timestamp T1 and the CRC value CRC1 corresponding to the image data.

The IS 220 or at least one multi-media processor transforms the image data while performing a processing operation, and may also change the CRC value accordingly. As illustrated in FIG. 8, the CRC value may be changed from the first CRC value CRC1 to a second CRC value CRC2 by an internal processing operation. In some example embodiments, the changed image data, the timestamp T1, and the changed CRC value CRC2 may be stored in the LUT 231.

Also, the changed data may be transmitted to the DPU 240 via the DRAM 230. The DPU 240 may generate a CRC value CRC' of the received data. According to example embodiments of the present inventive concepts, the generated CRC value CRC' may be stored in the LUT 231 of the DRAM 230 via the SFI 250.

A latency calculator (DIFF) of the SFI 250 calculates a difference between the timestamp T1 of the CRC value matched in the LUT 231 and the timestamp T2 at the time of outputting the data of the DPU 240, and output latency from a calculated value.

Figure 8B:
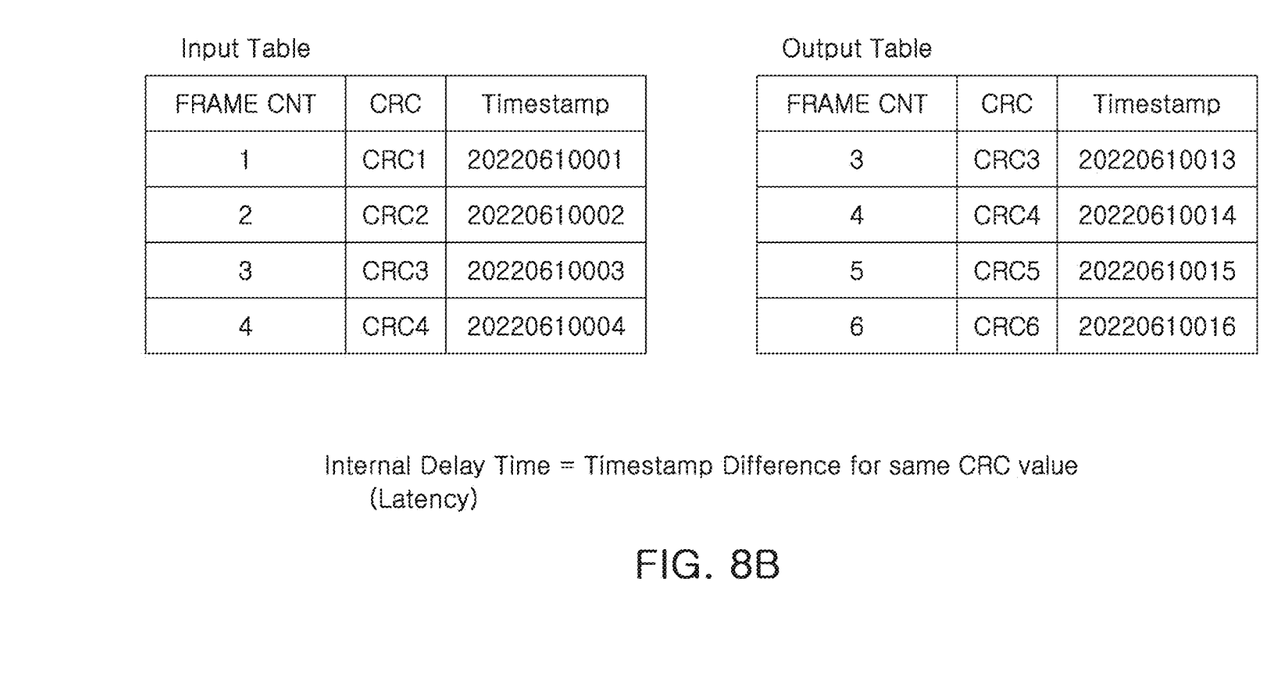
FIG. 8B is a diagram illustrating a process of calculating an internal delay time in an SoC according to example embodiments of the present inventive concepts.

FIG. 8B is a diagram illustrating a process of calculating an internal delay time in SoC according to example embodiments of the present inventive concepts. Referring to FIG. 8B, an internal delay time may be calculated using an input table and an output table.

The input table may include a frame counter value, a corresponding CRC value of the frame, and/or timestamp values at the time of input. The output table may include a frame counter value, a corresponding CRC value of the frame, and/or timestamp values at the time of output.

As illustrated in FIG. 8B, the internal delay time may be determined as a value obtained by subtracting the timestamp value (for example, 20220610013) of the input table from the timestamp value (e.g., 20220610003) of the output table corresponding to the frame 3 having the same timestamp value in the input table and the output table.

The latency measurement technique of the present inventive concepts may be applied to a semiconductor chip for a vehicle. The semiconductor chip for a vehicle includes an electronic control unit (ECU), an advanced driver assistance system (ADAS) chip, and/or a microcontroller unit (MCU). The ECU controls a state of a vehicle's engine, automatic transmission, ABS, etc. with a computer, and the ECU controls all parts of the vehicle. The ADAS chip recognizes some of the numerous situations that may occur while driving, determine a situation, and control mechanical devices.

The MCU is a dedicated processor for controlling a specific system. A semiconductor chip for an autonomous vehicle includes an ADAS processor, a neural network processor unit (NPU), a security integrated circuit, a memory, and the like. A neural network processor unit, an image sensor, a dynamic vision sensor, etc. are used for front detection driver monitoring. A front/side rear view camera includes a front/side rear view camera. An electronic mirror (eMirror) is implemented as an image sensor, a display driving chip (DDI), and a power management integrated circuit (PMIC). A car steering wheel includes a fingerprint recognition sensor, an iris recognition sensor, and a PMIC. Automotive lighting has LED packaging modules. Infotainment includes a processor/display driving chip (DDI), a touch integrated circuit, a security integrated circuit, and a memory. An electronic key has a security integrated circuit and a fingerprint recognition sensor.

Figure 9:
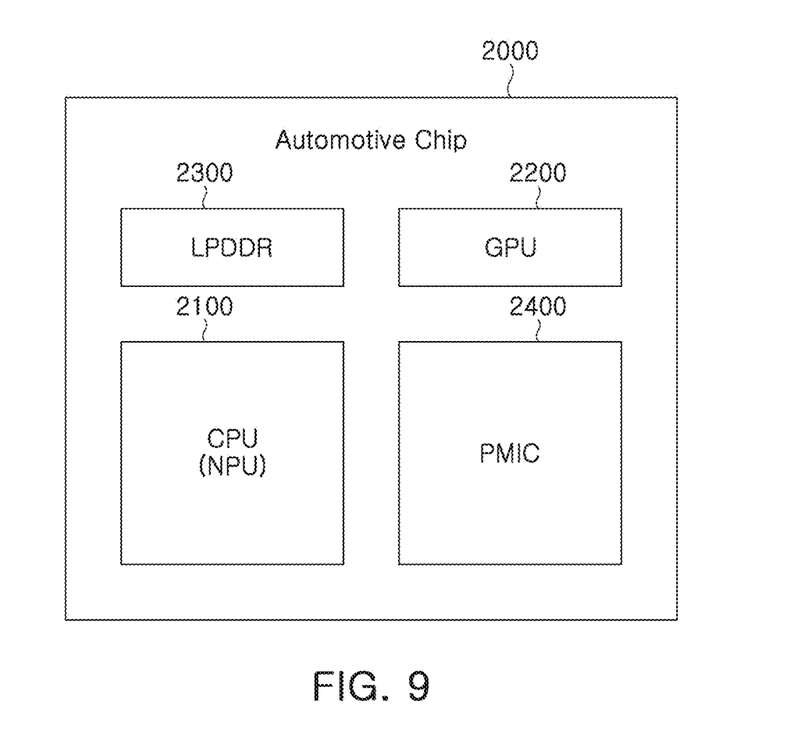
FIG. 9 is a diagram illustrating an SoC according to example embodiments of the present inventive concepts.

FIG. 9 is a diagram illustrating an SoC 2000 according to example embodiments of the present inventive concepts by way of example. Referring to FIG. 9, the SoC 2000 may include a CPU (or NPU) 2100, a GPU 2200, an LPDDR 2300, and/or a PMIC 2400. The SoC 2000 may be a semiconductor chip for a vehicle.

The CPU (or NPU, 2100) may be implemented to control overall operations of a semiconductor chip for a vehicle. The CPU 2100 may further include an NPU. In example embodiments, the CPU 2100 may be implemented to measure latency using an unique value of data as described above with reference to FIGS. 1 to 8. Although not illustrated, a separate security chip for measuring latency may be further included.

The GPU 2200 may be implemented to perform graphics-only processing operations. In general, a GPU is a processor for performing large-scale calculation in a simple form independently of a CPU. The GPU 2200 may perform a large amount of floating point calculations required for graphic processing at low cost. In example embodiments, the GPU 2200 may be implemented to measure latency using an unique value of data as described above with reference to FIGS. 1 to 8.

The LPDDR 2300 may be implemented to temporarily store data processed by the CPU 2100 or the GPU 2200. The LPDDR 2300 may store a first CRC table and a second CRC table.

When first data is input from a first external device, the first CRC table may include an input timestamp and a first CRC value of the first data. When second data is output to a second external device, the second CRC table may include an output timestamp and a second CRC value of the second data.

In example embodiments, the first external device may be one of a plurality of cameras, lidar sensor, radar sensor, or other vehicle sensors. In example embodiments, the plurality of SW stacks may include a first SW stack and a second SW stack. According to example embodiments of the present inventive concepts, the first SW stack and the second SW stack may transmit metadata in different data structures. In example embodiments, the CPU 2100 may measure an internal time delay using the first CRC table and the second CRC table according to a request from an external device. In example embodiments, the first CRC table and the second CRC table may be managed in the form of a ring buffer having a predetermined or alternatively, desired size.

The PMIC 2400 may be implemented to manage voltages required inside the SoC 2000. The PMIC 2400 may output voltages necessary for the operation of the CPU 2100, the GPU 2200, and the LPDDR 2300.

The SoC 2000 illustrated in FIG. 9 may be referred to as an application processor (AP). The AP may drive an operating system (OS) or application for driving.

The present inventive concepts may be applied to semiconductor chip for a vehicle of an automotive open system architecture (AUTOSAR) platform, for example, an ECU. A software layer of the AUTOSAR platform is divided into a basic software (BSW) layer, an application software layer, and a run-time environment (RTE).

The BSW layer is a standardized software layer providing necessary services for performing tasks required by software components, and provides services related to I/O, memory, and communication to AUTOSAR software components. The BSW layer is divided into a services layer, an ECU abstraction layer (EAL), a microcontroller abstraction layer (MCAL), and a complex driver.

A communication network service of the service layer, as a layer for providing a unified interface that removes dependency to lower communication devices, provides a unified communication method to the RTE layer. The communication network service includes software performing functions providing vehicle network communication, such as controller area network (CAN), local interconnect network (LIN), Ethernet, FlexRay, system basis chips (SBC), communication driver interfaces, such as communication hardware abstraction, and a vehicle network interface.

The application software layer includes AUTOSAR software components mapped to a specific ECU. The application software layer is implemented independent of a hardware layer, such as an MCU and communicates with all resources of a lower layer through the RTE layer. At this time, each component module uses the AUTOSAR interface to transmit and receive necessary data through the RTE layer. The application software component and the actuator software component handle the control logic of the system, the sensor component processes a control logic of a system, the sensor component serves as a hardware-dependent interface of an input unit, and the actuator component controls a hardware-dependent output unit. Accordingly, each software component exchanges data with each other through ports and interfaces as a basic unit mapped to the ECU implementing a corresponding application software function.

Figure 10:
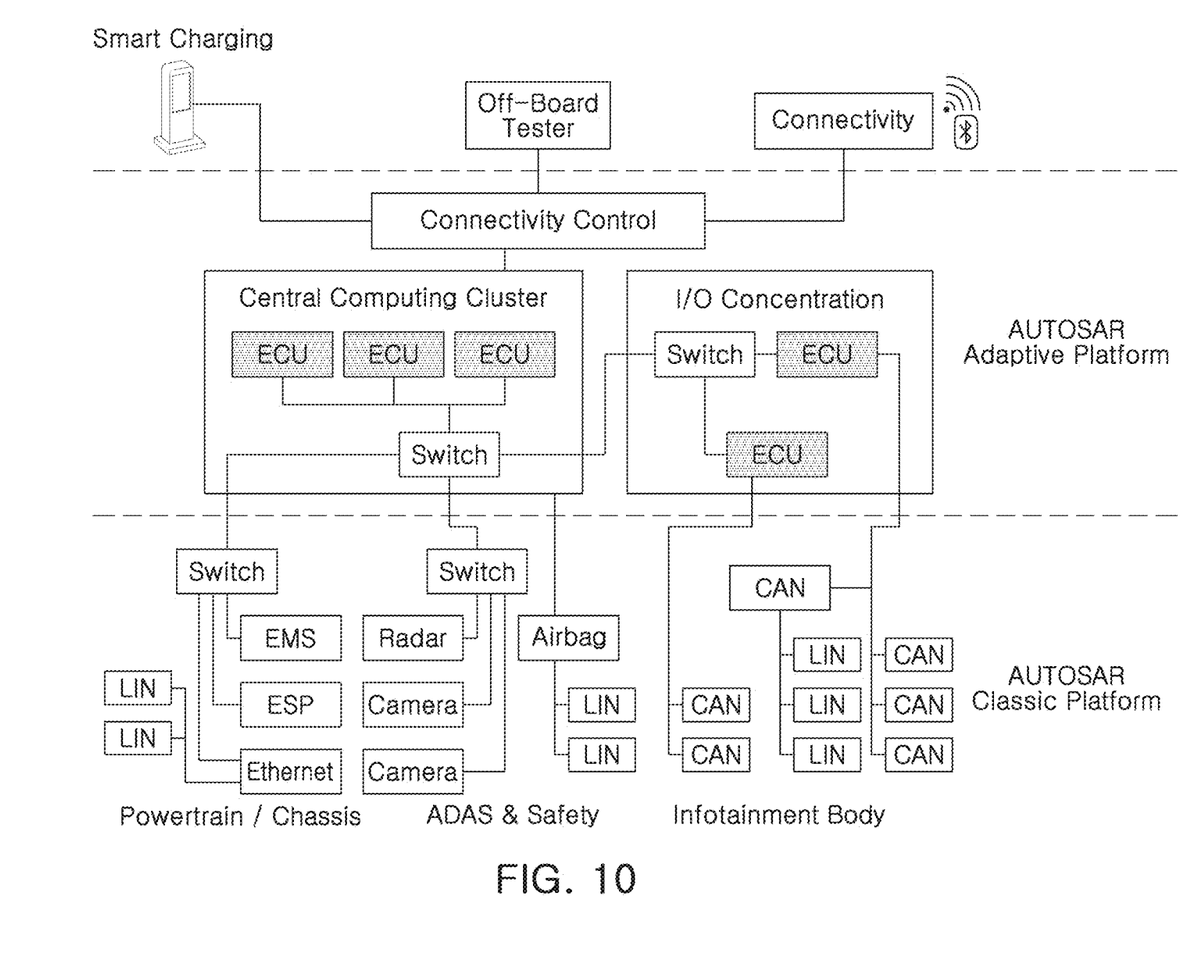
FIG. 10 is a diagram illustrating an AUTOSAR standard platform according to example embodiments of the present inventive concepts by way of example.

FIG. 10 is a diagram illustrating an AUTOSAR standard platform according to example embodiments of the present inventive concepts by way of example. Referring to FIG. 10, the latency measurement technique described above with reference to FIGS. 1 to 9 is applicable to at least one ECU. Adaptive AUTOSAR is used to correspond to complex platforms based on autonomous driving. The ECU may be implemented to suit various vehicle communication interfaces, such as CAN, LIN, Ethernet, FlexRay, and SBC.

The present inventive concepts are applicable to an autonomous driving security mechanism. These security mechanisms may require SoC internal latency measurements. For example, it may be used as a mechanism of a delay measurement subsystem of a system having safety or delay-related requirements (augmented reality (AR)/merged reality (MR)/extended reality (XR)).

The SoC, the data processing system having the same, and the operating method thereof according to example embodiments of the present inventive concepts may measure an internal delay time using an unique value of data in a heterogeneous SW stack structure.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While example embodiments have been illustrated and described above, it will be apparent to those skilled in the art that modifications and variations could be made without departing from the scope of the present inventive concepts as defined by the appended claims.

What is claimed is:

1. An operating method of a data processing system, the operating method comprising:
   recording an input timestamp of first image data to first metadata when the first image data are input to a first software (SW) domain;

calculating a first unique value of the first image data in the first SW domain;

storing the first metadata having the input timestamp and the first unique value in a lookup table (LUT);

calculating a second unique value of second image data in a second SW domain when the second image data are transmitted from the first SW domain to the second SW domain;

recording an output timestamp of the second image data in second metadata when the second image data are output from the second SW domain;

storing the second metadata having the output timestamp and the second unique value in the LUT;

selecting metadata in which the first unique value and the second unique value match each other in the LUT; and measuring a delay time of the data processing system using a difference between the input timestamp and the output timestamp corresponding to the selected metadata.

2. The operating method of claim 1, wherein each of the input timestamp and the output timestamp includes time information output from a real time clock (RTC) or an external clock source.

3. The operating method of claim 1, wherein each of the first unique value and the second unique value is a cyclic redundant check (CRC) value.

4. The operating method of claim 3, further comprising storing changed CRC value in the LUT when the CRC value is changed during transmission of image data.

5. The operating method of claim 1, further comprising receiving a measurement request for the delay time from an external device.

6. The operating method of claim 1, wherein the selecting the metadata and the measuring the delay time are performed in a secure SW domain.

7. The operating method of claim 1, wherein the LUT includes an input table storing the first metadata and an output table storing the second metadata.

8. The operating method of claim 7, wherein the selecting the metadata includes searching the input table and the output table for a list having a matching CRC value.

9. The operating method of claim 1, wherein the first SW domain and the second SW domain transmit data in different data structures.

10. The operating method of claim 1, wherein the first SW domain is a camera SW domain, and the second SW domain is a Linux SW domain.

11. An operating method of a system-on-chip (SoC) for autonomous driving, the operating method comprising:

receiving a request for measuring an internal delay time of a secure software (SW) stack included in the SoC;

measuring the internal delay time of the secure software (SW) stack using a cyclic redundant check (CRC) table and an output timestamp,
  wherein the CRC table includes an input timestamp of first data, a first CRC value of the first data, and a second CRC value of a second data; and utilizing the measured internal delay time to control one or more operations of a vehicle during autonomous driving, wherein the SoC is configured to measure the internal delay time by driving a device driver of the secure SW stack, and the operating method further comprises searching the CRC table for metadata having a same CRC value by the device driver.

12. The operating method of claim 11, wherein the SoC is configured to generate the metadata having a camera identification number, a frame counter, a CRC value, and a timestamp.

13. The operating method of claim 11, wherein the measuring the internal delay time includes:

calculating a difference value between the input timestamp and the output timestamp; and determining the difference value or a value corresponding to the difference value, as the internal delay time.

14. A data processing system comprising:

a plurality of cameras;

a data processor configured to receive image data from each of the plurality of cameras and to output the image data; and a display processing unit configured to receive the image data from the data processor and process the image data,
  wherein the data processor is configured to measure an internal delay time by driving a device driver of a multi-software (SW) stack structure included in the data processor and using a cyclic redundant check (CRC) table and an output timestamp,
  wherein the CRC table includes an input timestamp of first data, a first CRC value of the first data, and a second CRC value of a second data, and
  wherein the data processor is further configured to
    search the CRC table for metadata having a same CRC value by the device driver, and
    output the measured internal delay time, the measured internal delay time being used to control one or more operations of a vehicle.

15. The data processing system of claim 14, wherein the data processor is configured to generate first metadata in a camera SW stack domain and second metadata in a display SW stack domain, wherein the first metadata includes a camera identification number, a frame counter, the first CRC value, and the input timestamp, and wherein the second metadata includes the camera identification number, the frame counter, the second CRC value, and the output timestamp.

16. The data processing system of claim 14, wherein the data processor includes a latency calculator configured to calculate the internal delay time in a secure SW stack domain.

17. The data processing system of claim 16, wherein the latency calculator is implemented in software or hardware.

* * * * *

UNITED STATES PATENT AND TRADEMARK OFFICE
CERTIFICATE OF CORRECTION

| | | |
|---|---|---|
| PATENT NO. | : 12,367,172 B2 | Page 1 of 1 |
| APPLICATION NO. | : 18/297258 | |
| DATED | : July 22, 2025 | |
| INVENTOR(S) | : Byungjoon Baek et al. | |

It is certified that error appears in the above-identified patent and that said Letters Patent is hereby corrected as shown below:

On the Title Page

Item (54) and in the Specification Column 1, Lines 1-4 should read as follows: SYSTEM-ON-CHIP, DATA PROCESSING SYSTEM HAVING THE SAME, AND OPERATING METHOD THEREOF Signed and Sealed this
Twenty-eighth Day of October, 2025

John A. Squires
*Director of the United States Patent and Trademark Office*